United States Patent
Sheldon et al.

(10) Patent No.: US 7,457,795 B1
(45) Date of Patent: Nov. 25, 2008

(54) METHOD AND SYSTEM FOR TRANSFORMING MULTIPLE ALTERNATIVE EQUALITY CONDITIONS

(75) Inventors: Stephen Fife Sheldon, Seattle, WA (US); Arthur Vargas Lopes, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 739 days.

(21) Appl. No.: 10/761,029

(22) Filed: Jan. 19, 2004

(51) Int. Cl.
G06F 7/00 (2006.01)
G06F 17/30 (2006.01)

(52) U.S. Cl. .............................................. 707/2; 707/5
(58) Field of Classification Search ................. 707/2–5, 707/100, 200, 7
See application file for complete search history.

(56) References Cited

U.S. PATENT DOCUMENTS

| | | | | |
|---|---|---|---|---|
| 5,765,147 A | * | 6/1998 | Mattos et al. | 707/4 |
| 5,806,061 A | * | 9/1998 | Chaudhuri et al. | 707/3 |
| 5,960,427 A | * | 9/1999 | Goel et al. | 707/4 |
| 6,442,543 B1 | * | 8/2002 | Snodgrass et al. | 707/3 |
| 6,983,275 B2 | * | 1/2006 | Koo et al. | 707/5 |
| 7,120,623 B2 | * | 10/2006 | Ganesan et al. | 707/2 |
| 2003/0195881 A1 | * | 10/2003 | Koo et al. | 707/5 |
| 2004/0044662 A1 | * | 3/2004 | Ganesan et al. | 707/5 |
| 2004/0172400 A1 | * | 9/2004 | Zarom et al. | 707/100 |

* cited by examiner

Primary Examiner—Hung T Vy
(74) Attorney, Agent, or Firm—Baker Botts, LLP

(57) ABSTRACT

A method, computer program, and computer network are disclosed for transforming multiple alternative equality conditions between a database column and a set of values. The method includes identifying one or more groups of consecutive values in the set. The equality conditions corresponding to values found in one or more of the identified groups are removed. One or more inequality conditions corresponding to the one or more of the identified groups are added.

24 Claims, 6 Drawing Sheets

# METHOD AND SYSTEM FOR TRANSFORMING MULTIPLE ALTERNATIVE EQUALITY CONDITIONS

BACKGROUND

Query optimization is important in relational database systems that deal with complex queries against large volumes of data. Unlike earlier navigational databases, a query on a relational database specifies what data is to be retrieved from the database but not how to retrieve it. Optimizing a query against a relational database is not as important in transaction-oriented databases where only a few rows are accessed either because the query is well specified by virtue of the application or because the query causes the data to be accessed using a highly selective index. In decision support and data mining applications, where the space of possible solutions is large and the penalty for selecting a bad query is high, optimizing a query to reduce overall resource utilization can provide orders of magnitude of overall performance improvement.

One existing query optimization technique is to rewrite the user-specified query. The query is transformed into a logically equivalent query that costs less, i.e. requires less time, to execute. The existing techniques for query transformation include syntactic and semantic techniques. Syntactic or algebraic transformations use the properties of the query operators and their mapping to rewrite the query. Some forms of magic set transformation, most forms of predicate push down, and transitive closures are techniques that fall under this category. Semantic query transformations use declarative structural constraints and the semantics of an application's specific knowledge, declared as part of the database, to rewrite the query. Semantic query transformation based rewrites are called semantic query optimization or SQO.

SUMMARY

In general, in one aspect, the invention features a method for transforming multiple alternative equality conditions between a database column and a set of values. The method includes identifying one or more groups of consecutive values in the set. The equality conditions corresponding to values found in one or more of the identified groups are removed. One or more inequality conditions corresponding to the one or more of the identified groups are added.

Implementations of the invention may include one or more of the following. Identifying only groups with three or more consecutive values. Checking whether the set of values includes only discrete values. For each of the one or more of the identified groups, adding a greater than or equal to condition and a less than or equal to condition.

In general, in another aspect, the invention features a computer program for executing database queries that include multiple alternative equality conditions between a database column and a set of values. The program includes executable instructions that cause a computer to identify one or more groups of consecutive values in the set. The computer removes the equality conditions corresponding to values found in one or more of the identified groups. The computer also adds one or more inequality conditions corresponding to the one or more of the identified groups.

In general, in another aspect, the invention features a database system for executing database queries that include multiple alternative equality conditions between a database column and a set of values. The database system includes one or more nodes; a plurality of CPUs, each of the one or more nodes providing access to one or more CPUs; and a plurality of virtual processes, each of the one or more CPUs providing access to one or more virtual processes, each virtual process configured to manage data, including rows organized in tables, stored in one of a plurality of data-storage facilities. The database system also includes an optimizer that is configured to identify one or more groups of consecutive values in the set. The optimizer removes the equality conditions corresponding to values found in one or more of the identified groups. The optimizer also adds one or more inequality conditions corresponding to the one or more of the identified groups.

DETAILED DESCRIPTION

Figure 1:
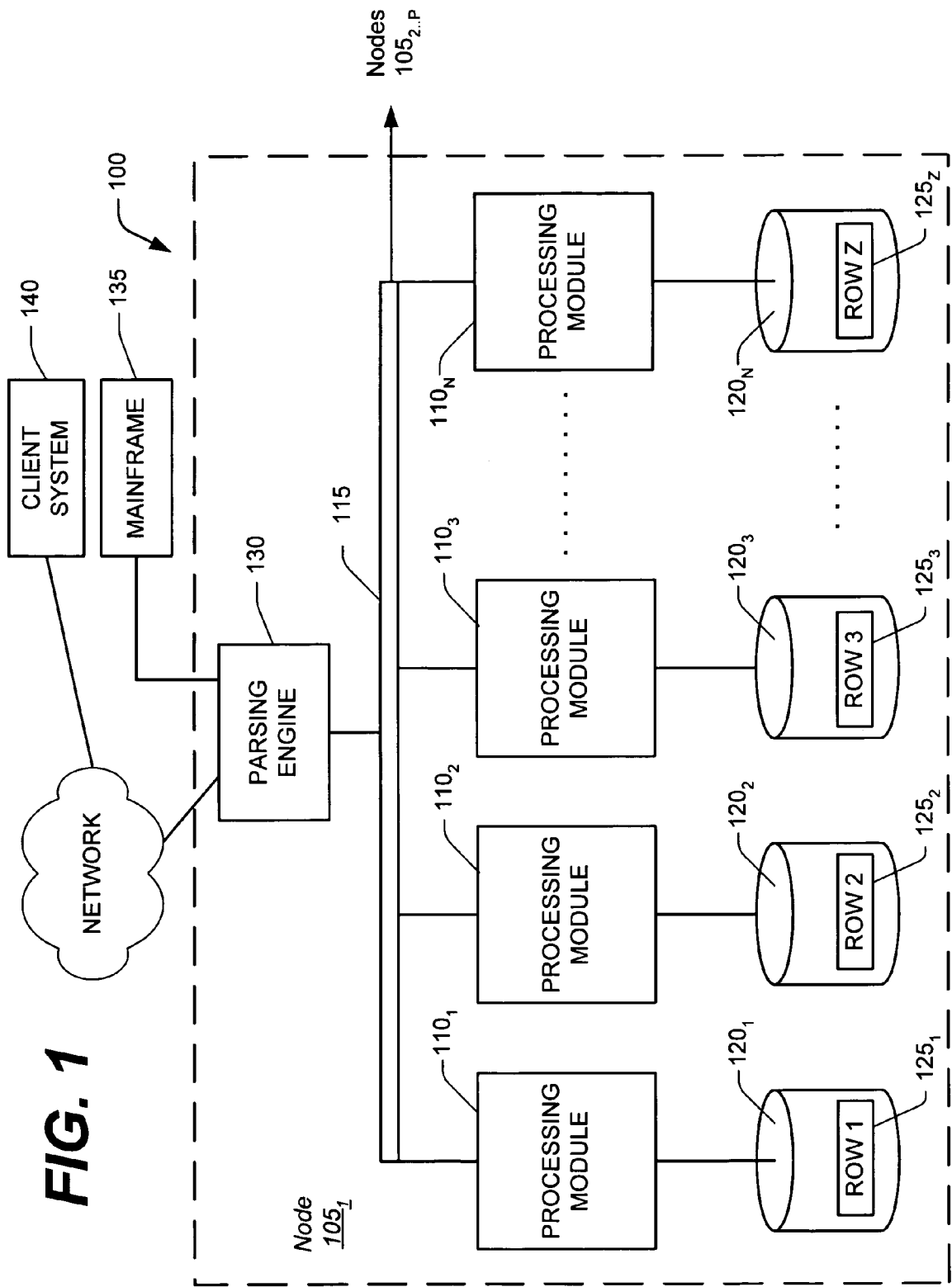
FIG. 1 is a block diagram of a node of a parallel processing database system.

The query optimization technique disclosed herein has particular application, but is not limited, to large databases that might contain many millions or billions of records managed by the database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots P}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_1 \ldots _N$. A parsing engine 130 organizes the storage of data and the distribution of table rows $125_1 \ldots _Z$ among the processing modules $110_1 \ldots _N$. The parsing engine 130 also coordinates the retrieval of data from the data-storage facilities $120_1 \ldots _N$ in response to queries received from a user at a mainframe 135 or a client computer 140. The DBS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

Figure 2:
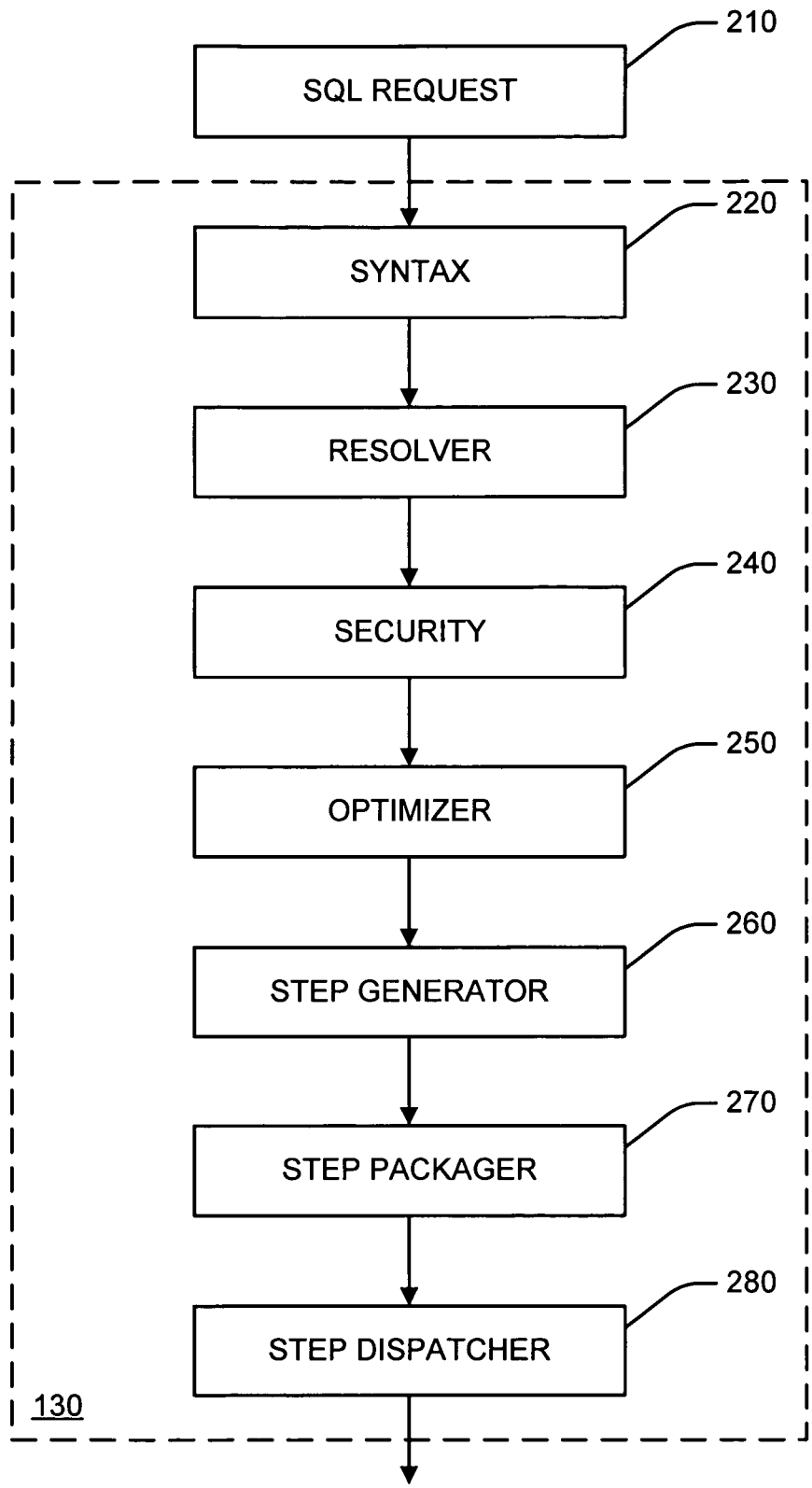
FIG. 2 is a block diagram of a parsing engine.

FIG. 2 is a block diagram of the parsing engine 130. An SQL request 210 is submitted to the parsing engine 130 and is initially checked for syntax 220. The resolver 230 then checks for and reports semantic errors and determines additional conditions based on transitivity. If one condition requires that the price is $10 and another requires that the cost is half the price, a third condition can be determined by transitivity: the cost is $5. The new conditions can be redundant with the original conditions, but can result in faster execution. For example, it is possible for a query to run more quickly with conditions of price=$10 and cost=$5 than with conditions of price=$10 and cost=50% (price).

Once the query has been processed by the resolver 230, it is passed to the security component 240 of the parsing engine 130. The security component 240 checks the security level of the database user who initiated the query. The security component 240 also checks the security level of the information sought by the request. If the user's security level is less than the security level of the information sought, then the query is not executed.

Once the query passes security it is analyzed by the optimizer 250. The optimizer 250 determines possible series of steps for executing the query. The optimizer 250 also estimates the costs associated with each series of steps. The cost associated with a series of steps is related to the amount of data encompassed by each condition corresponding to a step in the series. The execution of a query involves temporary results and sub-query results and the amount of data in those results is one factor in determining the costs of executing the query. A temporary result that requires a large amount of system resources to generate has high cost.

After estimating the costs associated with potential query execution plans, the optimizer 250 chooses the plan that has the lowest estimated cost. The more accurate the estimates of cost for particular execution plans, the more likely the optimizer 250 is to choose the correct plan. The optimizer 250 can access statistics describing the information stored in the database to help estimate the cost of conditions and temporary results corresponding to steps in query execution plans.

The plan chosen by the optimizer 250 is passed to the step generator 260. The steps are then sent to the step packager 270 and dispatched from the step dispatcher 280. If the plan chosen is not the optimal plan, the steps generated will require the use of more resources than the steps that would be generated by another plan that yields the same output. In a parallel database system servicing thousands of concurrent users, an increase in the resources employed for reach query can result in longer wait times for every user.

Figure 3:
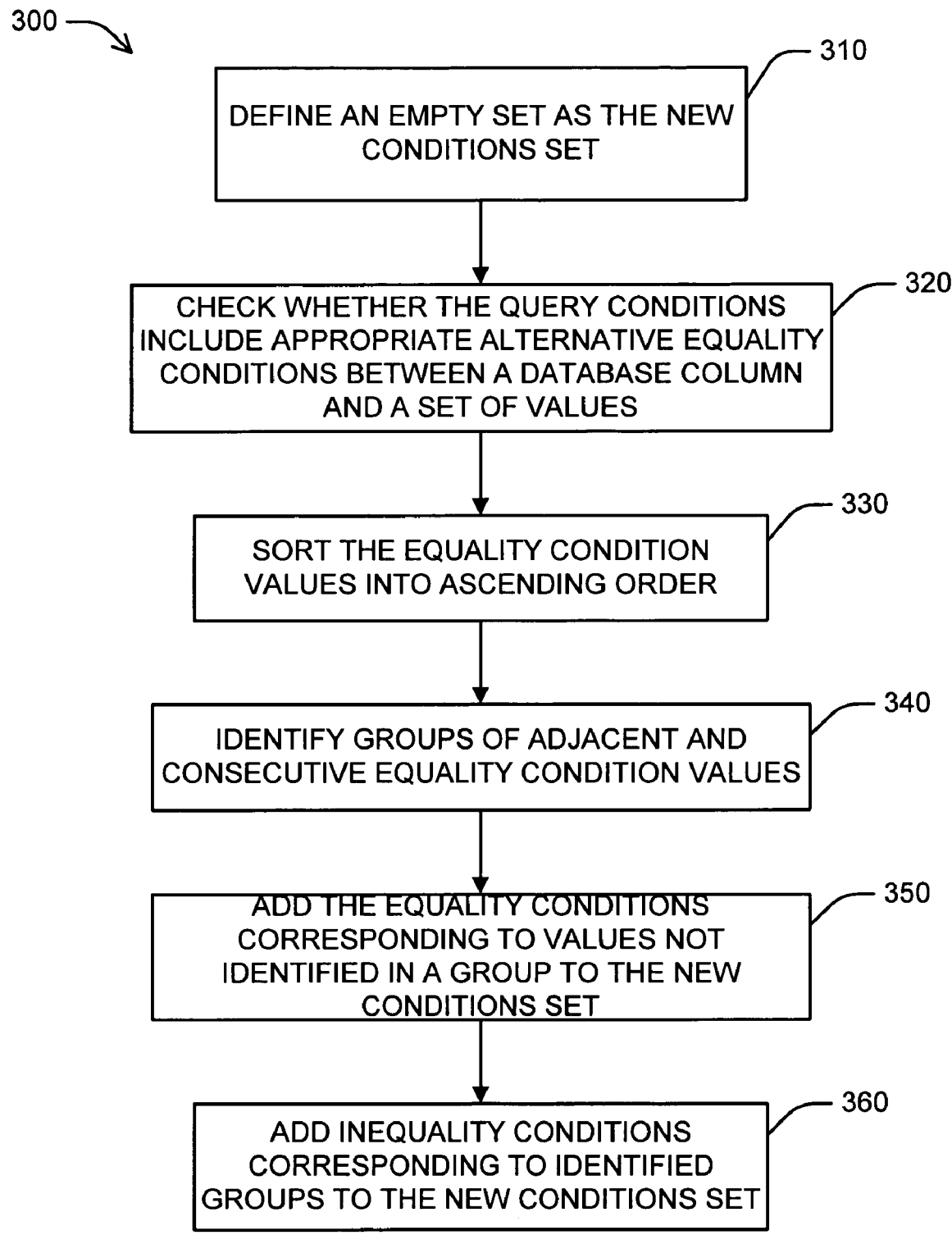
FIG. 3 is a flow chart of one method for transforming multiple alternative equality conditions in a query.

FIG. 3 is a flow chart of one method 300 for transforming multiple alternative equality conditions in a query. First, a new conditions set is defined as an empty set 310. The query is checked for whether there are appropriate alternative equality conditions between a database column and a set of values 320. The logical characterization of alternative equality conditions is equality condition linked with an 'or' operator. For example, if a database request asks for all products for which the price is $9.99 or the price is $19.99, then the two price conditions are alternative equality conditions. If the check is successful, then the equality condition values are sorted into ascending order 330. Groups of adjacent and consecutive values in the sorted set are identified 340. In one embodiment, if no groups are identified, the method ends. For each value in the set that is not identified as part of a group, an equality condition is added to the new conditions set 350. For each identified group, inequality conditions that bracket the group are added to the new conditions set 360. An example of one computer program for implementing the method is disclosed below. The Prepare, Transform, RemainingTerms, and AddRanges functions are discussed in more detail below with example computer programs.

PROCEDURE ReduceTerms (IN C, OUT NewC):

BEGIN

1. NewC<=[ ];

2. If not Prepare(C,V,NV,X) then a. Return;

3. Sort the values in V in ascending order;

4. Call Transform(V,NV,V2,N2,R,NR);

5. If NV=N2 then a. Return;—No reduction was achieved

Figure 4:
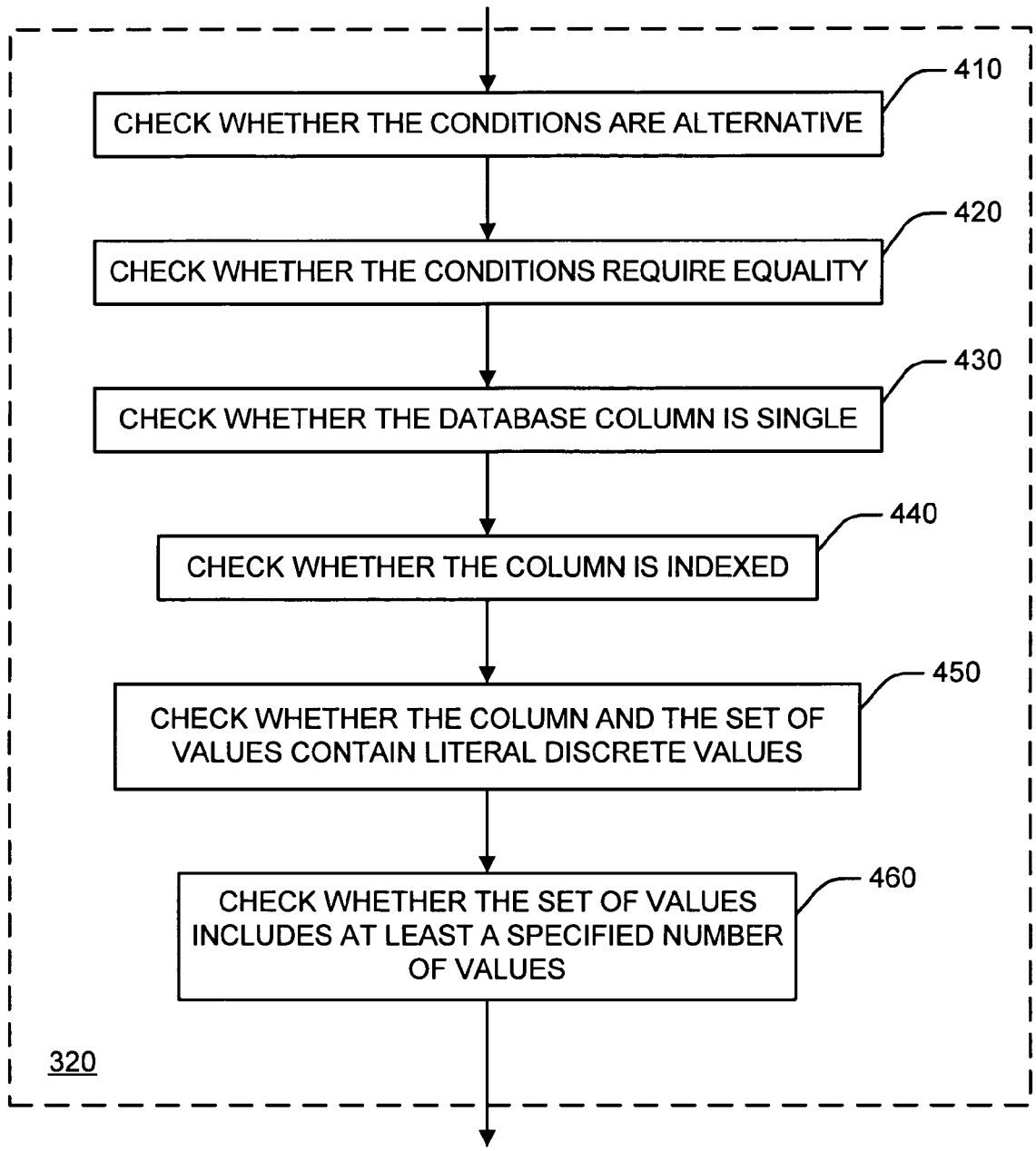
FIG. 4 is a flow chart of one method of checking the query conditions.

6. Call RemainingTerms(X, V2, N2, NewC);

7. Call AddRanges(R,NR,NewC);

END;

FIG. 4 is a flow chart of one method 320 of checking the query conditions. First, the conditions are checked to see if they are alternative, e.g., logically connected by an 'or' operator 410. Alternative conditions can also be represented as an in list in the form: X in (11, 12, 13 . . . 110). The conditions are checked for equality operators 420. The conditions are checked for relation to a single column 430. Alternative equality conditions between multiple columns and values do not meet the check. If the column is indexed, the method can be aborted 440. In another embodiment, the method is used on indexed columns. The value formats of the column and the set of values are checked for integer format 450. The number of values in the set is checked against a minimum number of values 460. The minimum number of values can be statistically calculated to reflect a greater than 50% chance that the execution time savings of transforming a certain number of alternative equality conditions is greater than the cost of carrying out the transformation. An example of one computer program for implementing the method of checking the query conditions is disclosed below.

FUNCTION Prepare(IN C; OUT V, N, X):

BEGIN

Figure 5:
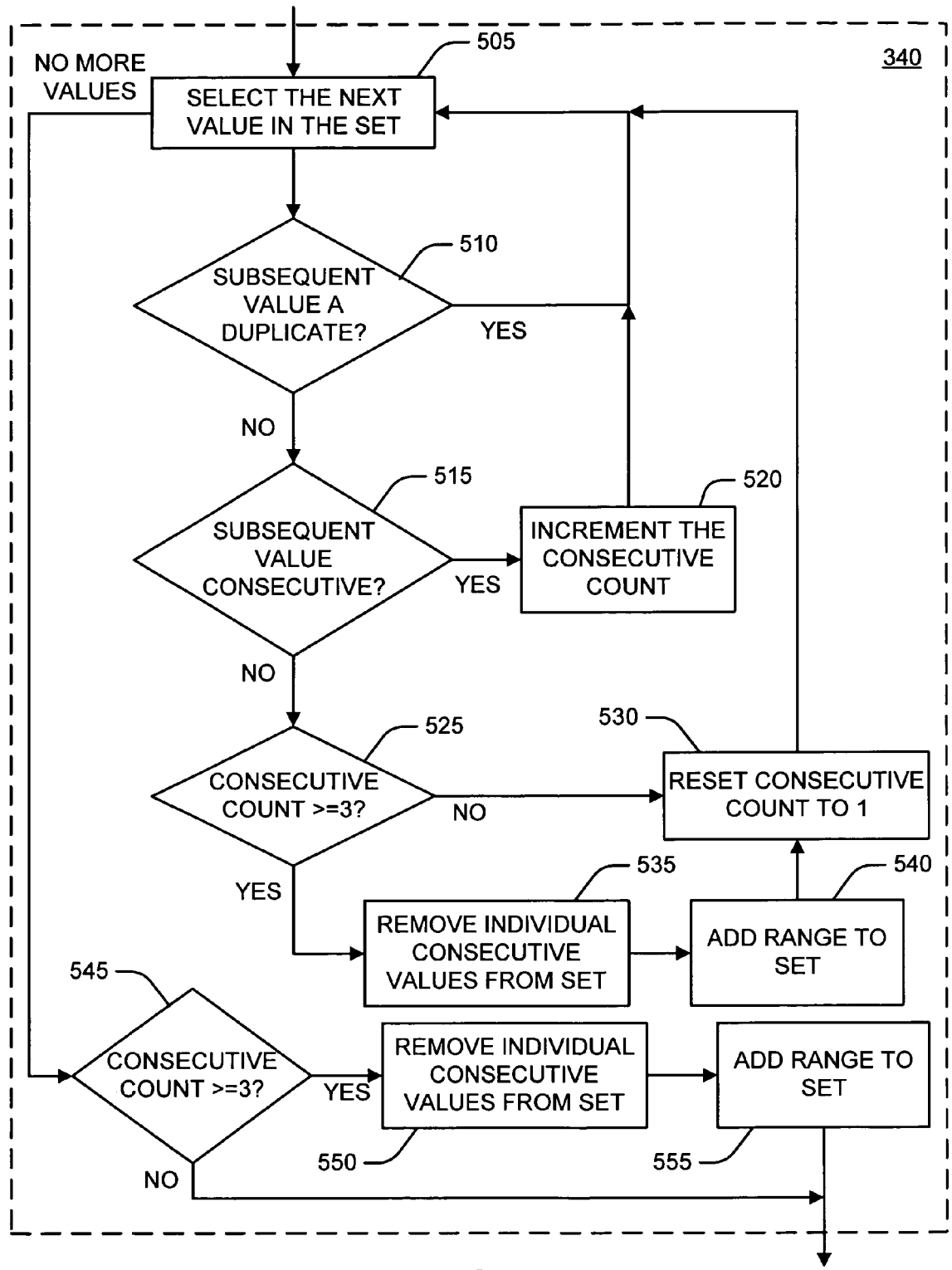
FIG. 5 is a flow chart of one method of identifying groups of adjacent and consecutive equality condition values.

1. N<=0;

2. V<=[ ];

3. X<=NIL;

4. For each term t in C do a. If the logical operator is not OR then
   i. Return false;
b. If t is not of the form X=V then
   i. Return false;
c. If X in X=V is not a column containing discrete values
   i. Return false;
d. Else If X=NIL
   i. X<=extract Column from t;
   ii. If X is an index then
      1. Return false;
e. Else If X not equal extract X from t then
   i. Return false;
f. If Vi is not a discrete value then
   i. Return false;
g. Increment N by 1;
h. V[N]<=Vi;
5. If N is less than T then
   a. Return false;
6. Return true;
END;

FIG. 5 is a flow chart of one method of identifying groups of adjacent and consecutive equality condition values 340. First, the next value in the set of values corresponding to the alternative equality conditions, initially the first value, is selected 505. If the subsequent value in the set is the same 510, then it is skipped 505. If the subsequent value is different, it is checked for whether it is consecutive 515. If it is consecutive, then the consecutive count (initially 1) is incremented 520. If it is not consecutive, step 525 compares the consecutive count to 3. If the count is at least three, then a group of at least three consecutive values has just ended and the individual values for that group are removed 535 and a range covering that group is added 540 to the set. In either case, step 530 resets the consecutive count to 1. When there are no more values in the set 505, step 545 compares the consecutive count to 3 to determine whether the set ended with a consecutive group. If it did, the individual values for that group are removed 535 and a range covering that group is added 540 to the set. In one embodiment, once the last consecutive count check is made, a check is made of whether any groups were identified and the method as a whole aborts if none were identified. An example of one computer program for implementing the method of identifying groups of adjacent and consecutive equality condition values is disclosed below.

Figure 6:
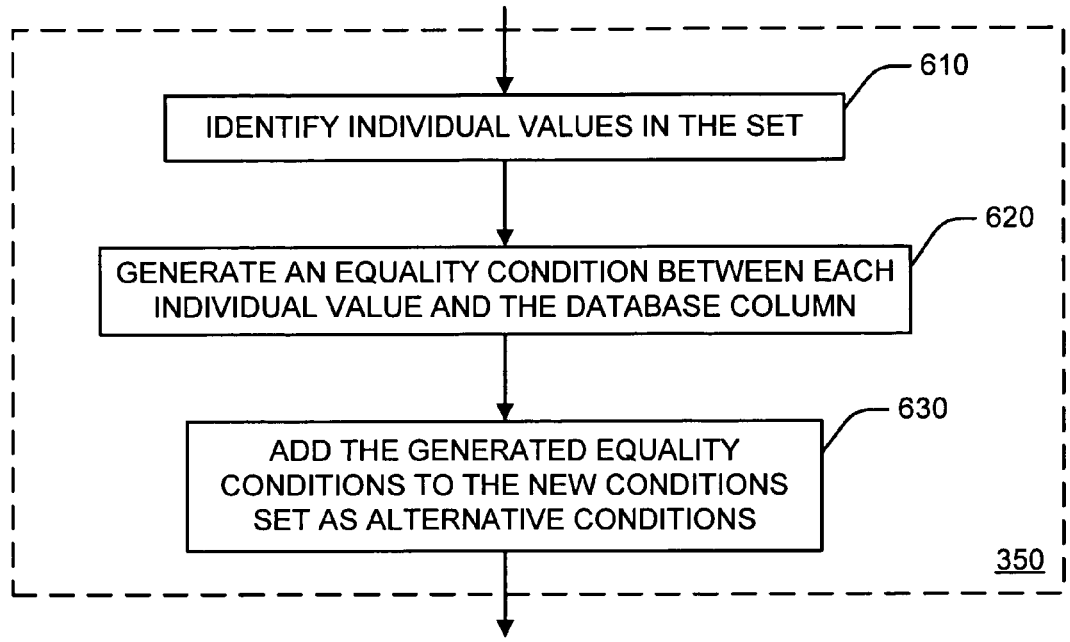
FIG. 6 is a flow chart of one method of creating a subset of equality conditions.

PROCEDURE Transform(IN V, N, OUT V2, N2, R, NR):
BEGIN
  1. NR<=0;—NR is the number of ranges
  2. N2<=0;—N2 is the remaining number of terms
  3. V2<=[ ];—V2 contains the remaining values
  4. R<=[ ];—R contains the ranges
  5. i<=1;
  6. While i<(N−2) do
    a. If V[i]=V[i+1] then—ignore duplicated values
      i. Increase i by 1;
      ii. Repeat step 6;
    b. k<=0;
    c. While V[i+k]+1=V[i+k+1] do
      i. Increase k by 1;
    d. If K>1 then—Got a range with k+1 values
      i. Increase NR by 1;
      ii. Add [V[i], V[i+k]] to R;
      iii. Increase i by k;
    e. Else
      i. While K>=0 do
        1. Increase N2 by 1;
        2. Add V[i] to V2[N2];
        3. Increase i by 1;
        4. Decrease k by 1;
END;

FIG. 6 is a flow chart of one method 350 of creating a subset of equality conditions. The individual values remaining in the set after groups have been identified are identified 610. Equality conditions between the database column and each remaining individual value are generated 620. The generated equality conditions are added to the new conditions set as alternative conditions 630. An example of one computer program for creating a subset of equality conditions in an in list format is disclosed below.

Figure 7:
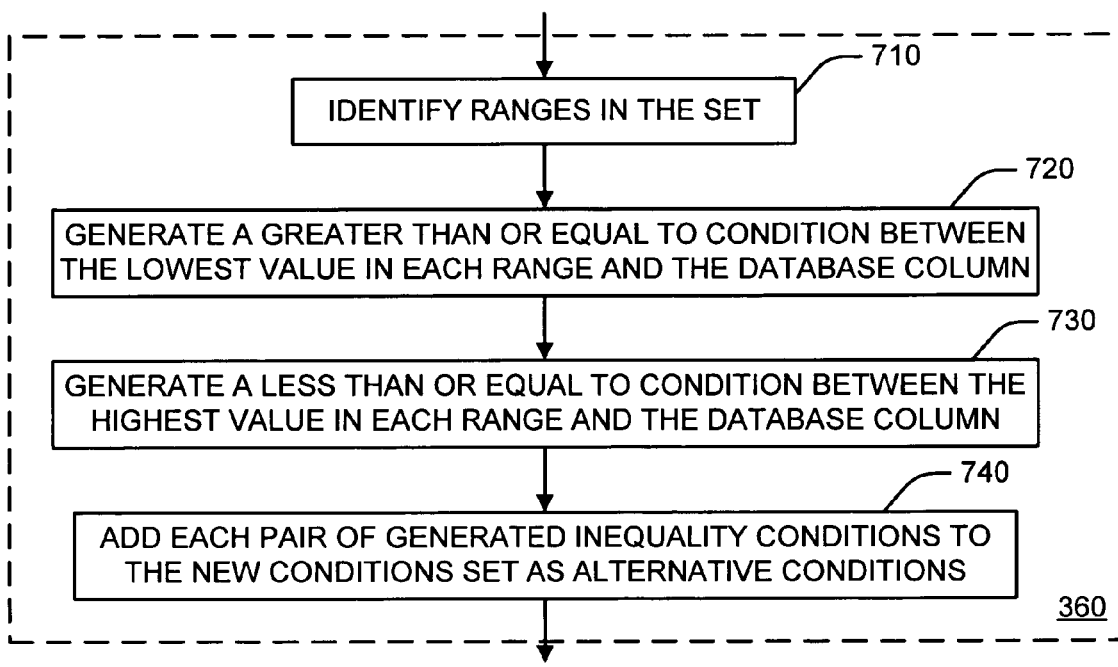
FIG. 7 is a flow chart of one method of adding inequality conditions for each group of adjacent and consecutive equality condition values.

BEGIN
  1. C<=New/Term(=,X,V2[1]);
  2. For i in 2 . . . N2 do
    a. T<=NewLogical(OR, C,New/Term(=,X,V2[i]));
    b. C<=T;
END;

FIG. 7 is a flow chart of one method 360 of adding inequality conditions for each group of adjacent and consecutive equality condition values. The ranges in the set are identified 710. A condition is generated for the lowest value in each range that the database column value must be greater than or equal to that value 720. A condition is generated for the highest value in each range that the database column value must be less than or equal to that value 730. The inequality conditions in each pair for a particular range are both required, they are not alternatives. The pairs as a whole, however, are alternatives. For example, if the set includes two ranges [5-9] and [12-18], then the following conditions result: [(column≧5) and (column≧9)] or [(column≧12) and (column≧18)]. The generated inequality conditions are added to the new conditions with each pair an alternative condition 740. An example of one computer program for adding inequality conditions for each group of adjacent and consecutive equality condition values is disclosed below.

PROCEDURE AddRanges(IN R, NR, IN OUT C):
BEGIN
  1. If C not equal NIL then
    a.1 Start<=1;
  2. Else
    a. Start<=2;
    b. C<=NewLogical(AND,New/Term(>=,X,R[1,1]),NewTerm(<=,X,R[1,2]));
  3. For i in Start . . . NR do
    a T<=NewLogical(OR,C,NIL);
    b C<=T;
    c T.Right<=NewLogical(AND,NewTerm(>=,X,R[i,1]), NewTerm(<=,X,R[i,2]));
END The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
    identifying multiple alternative equality conditions between a database column and a set of values in a query;
    identifying a group of consecutive values in the set;
    removing equality conditions corresponding to the values in the identified group;
    removing the values in the identified group from the set;
    adding a range of values corresponding to the values in the identified group to the set;
    adding an inequality condition between the database column and the least member of the range of values; and
    adding an inequality condition between the database column and the greatest member of the range of values.

2. The method of claim 1 further comprising the step of:
    checking whether the database column is a non-indexed column.

3. The method of claim 1 further comprising the step of:
    checking whether the set of values includes only literal discrete values.

4. The method of claim 1 further comprising the step of:
    checking whether the set contains more values than a specified lower limit.

5. The method of claim 1 where identifying the group of consecutive values in the set comprises identifying a group with the largest numbers of consecutive values.

6. The method of claim 1 where removing equality conditions corresponding to the values in the the identified group comprises creating a group of equality conditions that does not include equality conditions corresponding to those values.

7. The method of claim 1 where:
    the inequality condition between the database column and the least member of the range of values is a greater than or equal to condition; and
    the inequality condition between the database column and the greatest member of the range of values is a less than or equal to condition.

8. The method of claim 1 where identifying the group of consecutive values in the set comprises identifying a group of at least three consecutive values in the set.

9. A computer program, stored on a tangible storage, the program comprising executable instructions that cause a computer to:
    identify multiple alternative equality conditions between a database column and a set of values in a query;
    identify a group of consecutive values in the set;
    remove equality conditions corresponding to the values in the identified group;
    remove the values in the identified group from the set;
    add a range of values corresponding to the values in the identified group to the set;
    add an inequality condition between the database column and the least member of the range of values; and
    add an inequality condition between the database column and the greatest member of the range of values.

10. The computer program of claim 9 further comprising executable instructions that cause the computer to:
    check whether the database column is a non-indexed column.

11. The computer program of claim 9 further comprising executable instructions that cause the computer to:
    check whether the set of values includes only literal discrete values.

12. The computer program of claim 9 further comprising executable instructions that cause the computer to:
    check whether the set contains more values than a specified lower limit.

13. The computer program of claim 9 where the computer identifies the group of consecutive values in the set by identifying a group with the largest numbers of consecutive values.

14. The computer program of claim 9 where the computer removes equality conditions corresponding to the values in the the identified group by creating a group of equality conditions that does not include equality conditions corresponding to those values.

15. The computer program of claim 9 where:
    the inequality condition between the database column and the least member of the range of values is a greater than or equal to condition; and
    the inequality condition between the database column and the least member of the range of values is a greater than or equal to condition.

16. The computer program of claim 9 where the computer identifies the group of consecutive values in the set by identifying a group of at least three consecutive values in the set.

17. A database system comprising:
    one or more nodes;
    a plurality of CPUs, each of the one or more nodes providing access to one or more CPUs;
    a plurality of virtual processes, each of the one or more CPUs providing access to one or more virtual processes;
    each virtual process configured to manage data, including rows organized in tables, stored in one of a plurality of data-storage facilities; and
    an optimizer configured to:
        identify multiple alternative equality conditions between a database column and a set of values in a query;
        identify a group of consecutive values in the set;
        remove equality conditions corresponding to the values in the identified group;
        remove the values in the identified group from the set;
        add a range of values corresponding to the values in the identified group to the set;
        an inequality condition between the database column and the least member of the range of values; and
        add an inequality condition between the database column and the greatest member of the range of values.

18. The database system of claim 17 where the optimizer is further configured to:
    check whether the database column is a non-indexed column.

19. The database system of claim 17 where the optimizer is further configured to:
    check whether the set of values includes only literal discrete values.

20. The database system of claim 17 where the optimizer is further configured to:
    check whether the set contains more values than a specified lower limit.

21. The database system of claim 17 where the optimizer identifies the group of consecutive values in the set by identifying a group with the largest numbers of consecutive values.

22. The database system of claim 17 where the optimizer removes equality conditions corresponding to the values in the the identified group by creating a group of equality conditions that does not include equality conditions corresponding to those values.

23. The database system of claim 17 where:
the inequality condition between the database column and the least member of the range of values is a greater than or equal to condition; and
the inequality condition between the database column and the least member of the range of values is a greater than or equal to condition.

24. The database system of claim 17 where the optimizer identifies the group of consecutive values in the set by identifying a group of at least three consecutive values in the set.

* * * * *